US005901178A

United States Patent [19]
Lee et al.

[11] Patent Number: 5,901,178
[45] Date of Patent: * May 4, 1999

[54] POST-COMPRESSION HIDDEN DATA TRANSPORT FOR VIDEO

[75] Inventors: Chong U. Lee, San Diego; Kamran Moallemi, Del Mar; Jurg Hinderling, San Diego, all of Calif.

[73] Assignee: Solana Technology Development Corporation, San Diego, Calif.

[*] Notice: This patent is subject to a terminal disclaimer.

[21] Appl. No.: 08/912,434

[22] Filed: Aug. 18, 1997

Related U.S. Application Data

[63] Continuation-in-part of application No. 08/607,330, Feb. 26, 1996, Pat. No. 5,687,191.

[51] Int. Cl.⁶ ....................................................... H04B 1/22
[52] U.S. Cl. ........................... 375/240; 375/245; 348/398; 348/405; 348/406
[58] Field of Search ............................. 370/522; 375/260, 375/240, 377, 208, 244, 245, 316, 295; 348/390, 398, 404–406, 384

[56] References Cited

U.S. PATENT DOCUMENTS

| | | | |
|---|---|---|---|
| 3,845,391 | 10/1974 | Crosby | 455/39 |
| 4,079,419 | 3/1978 | Siegle et al. | 348/732 |
| 4,313,197 | 1/1982 | Maxemchuk | 375/210 |
| 4,425,661 | 1/1984 | Moses et al. | 375/200 |
| 4,534,054 | 8/1985 | Maisel | 381/4 |
| 4,644,422 | 2/1987 | Bedini | 360/60 |
| 5,113,437 | 5/1992 | Best et al. | 380/3 |
| 5,161,210 | 11/1992 | Druyvesteyn et al. | 704/200 |
| 5,185,800 | 2/1993 | Mahieux | 704/500 |
| 5,319,735 | 6/1994 | Preuss et al. | 704/205 |
| 5,379,345 | 1/1995 | Greenberg | 380/23 |
| 5,404,377 | 4/1995 | Moses | 375/200 |
| 5,408,686 | 4/1995 | Mankovitz | 455/66 |
| 5,450,490 | 9/1995 | Jensen et al. | 380/6 |
| 5,453,968 | 9/1995 | Veldhuis et al. | 369/84 |
| 5,481,643 | 1/1996 | Ten Kate et al. | 704/227 |
| 5,490,170 | 2/1996 | Akagirir et al. | 375/240 |
| 5,561,849 | 10/1996 | Mankovitz | 455/45 |
| 5,588,022 | 12/1996 | Dapper et al. | 375/216 |
| 5,598,228 | 1/1997 | Saitoh | 348/732 |

OTHER PUBLICATIONS

I.J. Cox, et al., "Secure Spread Spectrum Watermarking for Multimedia," NEC Research Institute, Technical Report 95–10, Dec., 1995, pp. 1–33.

Primary Examiner—Tesfaldet Bocure
Attorney, Agent, or Firm—Barry R. Lipsitz; Ralph F. Hoppin

[57] ABSTRACT

Auxiliary data is carried substantially imperceptibly with video transform data in combined transform samples according to a visibility threshold. The auxiliary data provides a capability for a copy protect scheme or verification of television viewing activity. The video transform samples are extracted from a compressed packetized data stream and normalized if required. The auxiliary data modulates data carrier sequences such as pseudo-noise (PN) spread spectrum signals in different spatial frequencies to provide auxiliary data subband samples, which are in turn combined with the video transform samples in one or more spatial frequencies to provide combined subband samples. The auxiliary data subband samples may be also spectrally shaped according to the video transform samples to improve concealment. The combined transform samples are then multiplexed into the packetized data stream. Full decompression of the video transform samples is not required. In a decoder, the combined transform samples are demodulated to recover the auxiliary data signal.

53 Claims, 7 Drawing Sheets

POST-COMPRESSION HIDDEN DATA TRANSPORT FOR VIDEO

This application is a-continuation-in-part of commonly assigned, U.S. patent application Ser. No. 08/607,330, filed Feb. 26, 1996, now U.S. Pat. No. 5,687,191, issued Nov. 11, 1997, incorporated by reference herein, which, in turn, claims the benefit of U.S. Provisional Application No. 60/008,288, filed Dec. 6, 1995.

BACKGROUND OF THE INVENTION

The present invention relates to a method and apparatus for hiding data in an audio or video signal, and more particularly to a scheme for providing an imperceptible auxiliary data signal in a compressed digital audio or video data stream being communicated over existing communication channels. The scheme is characterized as post-compression hidden data transport (PC-HDT) for video. A corresponding method and apparatus for recovering the hidden data from the audio or video signal are also disclosed, in addition to a digital data storage medium.

Generally, the capacity of a transmission channel to carry additional information is limited by the bandwidth of the channel. Since the bandwidth of communication channels is limited by realities of the electromagnetic spectrum, and, for wireless channels, may be regulated by law, techniques have been developed for increasing the amount of information that can be carried within a channel of a given bandwidth. For example, techniques for compressing digital data to squeeze more data within a given bandwidth or data storage space are well known.

Compression refers to reducing the number of data bits needed to encode a source signal so that the source signal may be recovered by a decoder with acceptable fidelity. For example, it is known that the human eye is relatively less sensitive to amplitude variations in high-frequency components of a video signal. Similarly, the human ear is relatively less sensitive to amplitude variations in high-frequency components of an audio signal. Accordingly, audio and video data can be encoded using frequency transform techniques which allocate fewer bits to high-frequency components. In this manner, the total number of data bits which must be transmitted is reduced, while a satisfactory picture and sound are still provided.

With the increased use of digital-audio and video content for television, computer graphics, compact discs, digital cameras, and the like, it would be desirable to provide hidden data in digital audio and video signals in a number of situations. For example, it may be desirable to enable data ancillary to the audio or video data to be carried to provide a copy management scheme which precludes the audio or video signal from being copied without proper authorization, or otherwise controls the use of the audio or video program or other information (e.g., multimedia) associated with the video signal. Additionally, information identifying the content of the audio or video signal, such as the name, source, sponsor and/or performers of an audio or video program, and polling information for market research or commercial verification might also be hidden. The scheme should be compatible with various storage media, including optical storage media such as the Digital Video Disc (DVD), Compact Disc (CD) including CD-ROM, and magnetic storage media such as Video Cassette Recorder (VCR) tape.

Further, the type of ancillary information carried by the audio or video signal should be virtually unlimited. For example, it would be advantageous to allow data that is completely unrelated to the audio or video signal to be carried (e.g., transmitting stock price data or "electronic coupons" with a movie). Moreover, the scheme used to hide data in the audio or video signal should be able to hide either a modulated carrier, an unmodulated carrier (e.g., pilot), or a combination of both.

It would further be desirable for the auxiliary information to be substantially imperceptibly transported concurrently with a primary audio or video signal. In one such technique, the bandwidth of the audio or video channel remains as is, and additional information is packed with the audio or video information such that it can be retrieved without significantly degrading the quality of the primary audio or video signal.

The scheme should be compatible with audio or video decoders which do not have the capability to retrieve the auxiliary information as well as with special decoders which can retrieve the auxiliary information. Additionally, video decoders may have the capability to subtract the supplemental information from the video data prior to transforming the video data to the pixel domain in order to recover the video data with essentially no degradation in quality.

The scheme should be compatible with existing digital video data communication schemes, where a video signal is digitized, spatially transformed, compressed, packed in a predefined frame format, and then transmitted in a bitstream. The scheme should thus allow hidden data to be embedded in the compressed transform samples without requiring full decompression of the signal.

The scheme should provide a method for hiding auxiliary data in a digital audio or video data stream which is communicated over existing communication paths as a pre-existing bitstream, without substantially altering the quality of the audio or video signal, or interfering with other data in the bitstream.

In particular, the scheme should allow the provision of auxiliary data in respective subbands (e.g., spatial frequencies) of a digital compressed video data stream, or in respective subbands of a digital compressed audio data stream. Similarly, the scheme should allow recovery of the auxiliary data from the compressed digital audio or video signal. Finally, the scheme should provide spectral shaping of the auxiliary signal to enhance its concealment.

The present invention relates to a method and apparatus for transporting and recovering information hidden in a digital audio or video signal having the aforementioned and other advantages.

SUMMARY OF THE INVENTION

In accordance with the present invention, a method and apparatus are provided for hiding auxiliary information in a compressed digital audio or video signal which is transmitted over a communication channel in a pre-existing bitstream without requiring full decompression of the audio or video data in order to embed the auxiliary data. Furthermore, by embedding the same auxiliary data into different subbands of the audio or video data, advantageous signal-to-noise ratio (SNR) characteristics result. Spectral shaping of the auxiliary data signal can be provided to enhance its concealment.

A method for providing auxiliary data subband samples in a digital video data stream includes the step of providing a plurality of video transform samples from the data stream. Each transform sample is associated with a spatial frequency. Pixel data may be spatially transformed using the Discrete Cosine Transform (DCT) or other transform to provide the video transform samples which are subsequently recovered from the data stream. A data carrier sequence such as a M-ary spread spectrum signal (where $M \geq 2$) or other white noise signal is modulated by an auxiliary data signal to provide the auxiliary data subband samples. The auxiliary data subband samples are combined with corresponding video transform samples to produce combined transform samples in which the auxiliary data subband samples are carried substantially imperceptibly (e.g., invisibly). That is, pixel data recovered from the combined transform samples will have an image quality that is substantially the same as pixel data recovered from the video transform samples. The presence of the auxiliary data subband samples will not reduce image quality for the average viewer. The combined transform samples are provided for transport in the digital video data stream.

In alternate embodiments, multiple layers of auxiliary data subband samples are encoded in the digital video data stream. Each layer can have a unique corresponding pseudo-noise (PN) sequence, or the same PN sequence may be used by shifting the relative position of the layers. Furthermore, subband samples from different auxiliary signals can be embedded in respective different spatial frequencies (e.g., one signal per frequency), the same spatial frequency (e.g., more than one signal per frequency), or combinations thereof in the digital video data stream. The data carrier sequence may comprise a spread spectrum PN sequence, a "sparse" PN sequence, a "sample twiddle" sequence, or a "bit twiddle" sequence.

When the video transform samples have a nonuniform power spectrum, the method includes the further steps of normalizing the video transform samples to provide an approximately uniform power spectrum thereof. The combined transform samples are de-normalized subsequent to the normalizing step to restore the nonuniform power spectrum of the video transform samples, and to spectrally shape the auxiliary data subband samples in the combined transform samples according to the nonuniform power spectrum.

The data carrier sequence may be modulated by different auxiliary data signals to allow combined transform samples in which respective auxiliary data subband samples corresponding to the different auxiliary data signals are carried. That is, each combined transform sample may carry an auxiliary data subband sample from a different auxiliary data signal. Upon demodulation, such combined transform samples can be tracked independently to recover the respective auxiliary data signals.

Alternatively, the combined transform samples can carry auxiliary data subband samples from a single auxiliary data signal such that serial demodulation of the combined transform samples of a single image results in serial recovery of the auxiliary data subband samples from the single auxiliary data signal.

In another alternative, auxiliary data subband samples from a plurality of auxiliary data signals are carried in a single spatial frequency. This allows a time-multiplexing scheme wherein, for example, temporally successive first, second and third combined transform samples from a single spatial frequency include auxiliary data subband samples from first, second and third auxiliary data signals, respectively.

Bits are allocated to quantize the combined subband samples according to a visibility threshold so that the auxiliary data subband samples will be substantially imperceptible. For example, the visibility threshold may provide a minimum signal to noise ratio of the video transform samples relative to the auxiliary data subband samples which should be maintained.

The video transform samples may comprise spatially transformed pixel data from an intra coded image and/or a differentially coded image. For differentially encoded images, the bit rate of the auxiliary data may be reduced relative to intra coded images due to the reduced number of bits allocated to code the differential signals.

Similarly, a method is presented for recovering auxiliary data subband samples representative of an auxiliary data signal from a compressed digital video data stream. The auxiliary data subband samples are provided by modulating a first data carrier sequence by the auxiliary data signal. The auxiliary data subband samples are carried with video transform samples in combined transform samples in the data stream.

Combined transform samples are recovered from the data stream, and a recovery data carrier sequence corresponding to the first data carrier sequence is provided. The combined transform samples are processed using the recovery data carrier sequence to recover the auxiliary data subband samples. The processing may include the steps of demodulating (e.g., mixing) the recovered combined transform samples using the recovery data carrier sequence to recover the auxiliary data subband samples, and is integrating the recovered auxiliary data subband samples to provide despread auxiliary data subband samples. Despreading is achieved by the combination of mixing and integrating. The despread auxiliary data subband samples are summed across selected spatial frequencies to recover the auxiliary data signal.

When the video transform samples have a nonuniform power spectrum, the combined transform samples are normalized to provide an approximately uniform power spectrum for the video transform samples in the combined transform samples.

The recovery data carrier sequence may be filtered over a plurality of spatial frequencies of the video transform samples, in which case the auxiliary data subband samples may be carried in a plurality of spatial frequencies.

Corresponding encoding and decoding apparatus are also disclosed.

Furthermore, a compressed digital data storage media is disclosed which includes storage means for storing combined transform samples including video transform samples which represent a video signal, and auxiliary data subband samples which represent an auxiliary data signal. The auxiliary data subband samples are provided by modulating a data carrier sequence by the auxiliary data signal over at least one spatial frequency corresponding to the video transform samples. The auxiliary data subband samples are carried substantially imperceptibly in the video signal, and are spectrally shaped according to the video transform samples. The storage media further includes means for allowing the recovery of the auxiliary data signal from the auxiliary data subband samples.

DETAILED DESCRIPTION OF THE INVENTION

Figure 1:
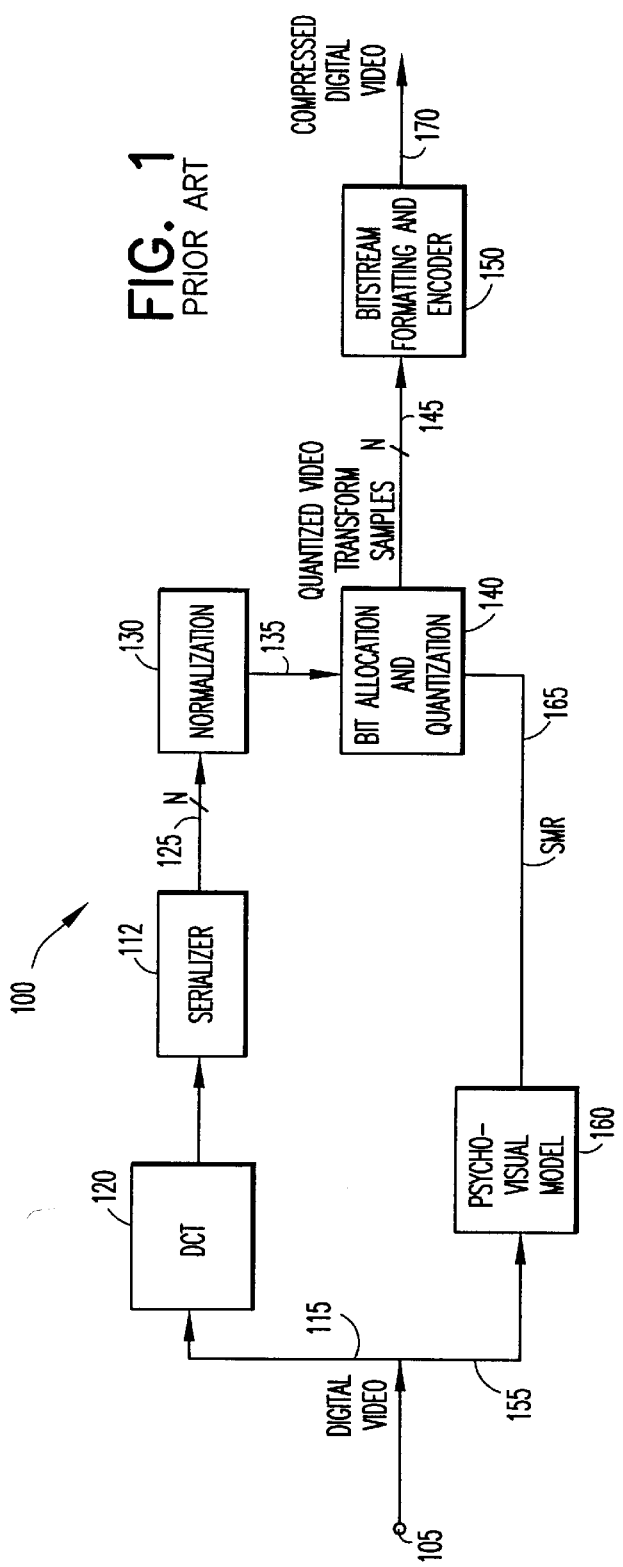
FIG. 1 is a block diagram of a conventional psycho-visual video encoder.

The present invention relates to a method and apparatus for providing an imperceptible subband coded auxiliary data signal in a compressed digital video data stream being communicated over existing channels. The phrase "subband coded" includes both filter bank based coding, such as Quadrature Mirror Filters (QMF) and pyramid coding, and transform coding such as the Discrete Fourier Transform, Discrete Cosine Transform, Karhunen-Loeve Transform, Walsh Hadamard Transform, wavelet transform, as well as other known spatial transforms. The term "transform coded" refers specifically to data which is spatially transformed, e.g., over two (or more) dimensions.

The present invention is compatible with existing modern video compression algorithms which rely on some form of spatial transform coding technique including, for example, the MPEG-2 video standard of the Moving Picture Experts Group (MPEG). Under the MPEG-2 standard, digital video data can be transmitted with other digital data (e.g., audio, closed caption data, stock prices, and the like) in a packetized transport stream which is transmitted via satellite or terrestrial methods to an individual's home or to the headend of a cable television distribution system. Alternatively, the transport stream can be provided locally from an encoded source media, such as a digital video disc (DVD), compact disc (CD) or digital video cassette (DVC).

Due to the method of representing visual information in imaging systems, there is an inherent redundancy in a conventional image representation. A digital representation of a picture is achieved by recording the intensity or brightness (e.g., luminance) of a scene at each sampling point (e.g., pixel), where a two-dimensional array of pixels represents a picture. Although each pixel value is represented as an amplitude or voltage in an imaging system, human visual perception is more attuned to the structured relationship between the pixels rather than the precise values of individual pixels.

One method of exploring this relationship between pixels is to model visual perception with a bank of filters or a spectrum analyzer. This frequency domain representation is reasonable since a low-pass filtered picture simply looks a little blurry compared to the full bandwidth picture, and still conveys most of the visually important information to the human viewer. This is true for both still images, such as those conforming to the Joint Bi-level Imaging Group (JBIG) and Joint Photographic Experts Group (JPEG) standards promulgated by the International Standards Organization (ISO), and moving images, such as those conforming to the MPEG-1 or MPEG-2 standards. The term "video" as used herein refers to both still images and moving images. A moving image, of course, is comprised of a series of still images.

Each image (such as a 16×16 pixel macroblock) may be coded independently of the other images (e.g., intra coded) or differentially coded with respect to another image, such as from a preceding or subsequent frame.

Once in the frequency domain, some of the redundancies in the pixel-by-pixel representation of an image can be taken advantage of since vision is less sensitive to noise introduced in the high spatial frequency components of the picture. In addition, visual perception is logarithmic in that the required fidelity or signal to noise ratio (SNR) at each frequency is somewhat constant over a wide range of intensity values at a given frequency. Thus, once the signal to noise ratio exceeds a certain threshold, the noise is no longer visible. See, e.g., "Spatial Frequency Masking in Vision: Critical Bands and Spread of Masking", by Stromeyer and Julesz, Journal of the Optical Society of America, vol. 62, Oct. 1972. The required SNR is typically approximately 30 dB, and is referred to herein as a "visibility threshold." A weighted noise power SNR of 26–52 dB, which has been used as a visibility threshold for analog television signals with wide band (e.g., random) noise, may also be suitable. Generally, a satisfactory SNR can be determined through experimentation. The visibility threshold can be exploited in image compression standards when quantizing a video image.

Psycho-visual models of human visual perception, such as discussed in "Digital Pictures, Representation and Compression (2nd ed.)," by A. N. Netravali and B. G. Haskell (Plenum Press, New York, N.Y., 1995), define the visibility threshold of a stimulus as the magnitude of the stimulus at which it becomes just visible or just invisible. The stimulus discussed herein refers to an image region in which auxiliary data is present, as will be described more fully below. At the threshold, the probability of detection by a human viewer is 50%. Various factors affect the visibility threshold, including the average background luminance level against which the stimulus is presented, supra-threshold luminance changes in time and space, and spatial shape and temporal variations of the stimulus. Other variables include the size of the image (e.g., television screen), the viewing distance, ambient light levels, and the viewer's visual acuity.

A satisfactory image quality is provided for most viewers using 6 MHz of bandwidth for analog video such as that conforming to the NTSC (National Television Standards Committee) standard. A corresponding compressed digital image can be transmitted at a data rate of less than 5 Mbps (Million bits per second). Moreover, newly proposed high-definition television (HDTV) systems by the ATSC (Advanced Television Standards Committee) can transmit a 30 MHz bandwidth video signal at 20 Mbps using digital compression. In both digital signals, the picture is transformed into the frequency domain by a spatial transform such as the DCT before analysis and compression takes place.

Frequency domain analysis for video is not as robust and precise as that for audio since the frequency dependent masking phenomena for video is not well understood. The range over which the signal is perceived to be stationary is much shorter for visual perception than for auditory perception. Accordingly, a shorter transform size is used, such as an 8 point DCT (in each dimension) for most video compression schemes, as compared to up to a 256 point Fast Fourier Transform (FFT) in audio compression schemes. Also, the phase information is much more sensitive with video than with audio, so processing must be very localized for video, e.g., within several pixels in each direction. Moreover, filtering operations should be isotropic since there is no "spatial directionality" with video, unlike the direction of time in audio.

A variety of coding techniques are available for coding audio and video digital data. In particular, subband coding is a form of spectral waveform coding that is common among modern audio data compression schemes, but can be also be used with other data waveforms.

Generally, an analog waveform representing data can be coded to the digital domain using a variety of techniques, including temporal waveform coding such as pulse code modulation (PCM) and differential pulse code modulation (DPCM), model-based source coding, and spectral waveform coding. Spectral waveform coding encompasses adaptive transform coding and subband coding. As used herein, the term "subband coding" is meant to include both filter bank based coding and transform coding. The two methodologies are similar since, in either case, data corresponding to predefined frequency bands or spatial frequencies of a waveform is coded.

With adaptive transform coding, the waveform is sampled and divided into frames with a predetermined number of data samples. The data in each frame is transformed into the spectral domain using the DCT or other transform, and then coded.

With filter bank based coding, the analog signal is filtered into a number of frequency bands or subbands, and the signal in each subband is separately encoded. For example, in speech encoding, the subbands are often sized narrower at lower frequencies since quantization noise is more noticeable at lower frequencies, and more encoding bits are allocated to the lower frequency subbands than the higher frequency subbands.

Spectral envelope (i.e., power spectrum) information can be obtained from an audio or video signal by measuring the amount of signal energy in each subband, where the signal power is proportional to the square of the signal amplitude. This information can be used to normalize the subband samples prior to encoding, for example, by scaling the samples by a maximum amplitude value such that all normalized samples have a value between zero and one. The scale factors can be transmitted along with the encoded data samples to allow reconstruction of the signal at a receiver.

Additionally, the spectral envelope information can be used advantageously in allocating bits to encode the data in each subband. For example, since the amount of perceptually tolerable noise in a subband is proportional to the signal energy in that subband, quantization noise in subband frequencies with relatively higher signal energy will be more tolerable, and data samples from such subbands can be allocated fewer bits. Moreover, a subband with a signal energy which is significantly higher than a neighboring subband may tend to "drown out" the neighboring subband. Thus, additional quantization noise in the neighboring subband may not be perceptible, and fewer bits can be allocated for coding the weaker subband. In many modern audio encoders, three or four bits are typically allocated per data sample. For a video transform samples, up to eight to ten bits may be used. Bit allocation data can be transmitted along with the encoded data samples to allow inverse quantization of the signal at a receiver.

FIG. 1 is a block diagram of a conventional psycho-visual video encoder. A psycho-visual encoder, shown generally at 100, can be used to provide a video transform samples in a compressed digital signal to the post-compression hidden data transport encoder of the present invention as discussed in connection with FIGS. 4, 5 and 7. First, digital video data is received by the encoder via terminal 105.

The digital video signal is communicated via line 115 to a DCT function 120, and via line 155 to a psycho-visual model 160. The DCT function 120 performs a time domain to frequency domain mapping of the video signal. For example, an 8×8 DCT may be used to provide video transform samples in sixty-four different spatial frequencies. Each 8×8 block of source image samples is essentially a sixty-four point discrete signal which is a function of two spatial dimensions. The DCT function 120 decomposes the signal into sixty-four orthogonal basis signals, each of which contains one of sixty-four unique spatial frequencies which describe the spectrum of the video signal. The coefficient values output from the DCT function 120 indicate the relative amount of the two-dimensional spatial frequencies contained in the input video signal.

The coefficient with zero frequency in both dimensions is the DC coefficient, while the remaining coefficients are AC coefficients. Typically, sample values will vary slowly from pixel to pixel across an image so that the signal energy will be concentrated in the lower spatial frequencies, and many of the higher spatial frequencies will have an amplitude of zero, or near zero. In fact, about 75% of the spatial frequencies will have zero or near zero energy.

The video transform samples are scanned in a zigzag pattern, row by row, or other known manner by a serializer 112 to provide a serial (e.g., one-dimensional) data stream of N transform samples to a normalization function 130 via line 125. Each output of the DCT function 120 faithfully represents the part of the video signal that falls within a particular spatial frequency.

The psycho-visual model 160 calculates a signal-to-mask ratio (SMR) which is used in subsequent bit allocation and quantization. The SMR is indicative of the noise level in each spatial frequency that would be barely perceptible to the average person, and is proportional to the video signal energy in the spatial frequency. The psycho-visual model 160 may also account for a masking phenomena between spatial frequencies, where a spatial frequency with significantly higher energy will tend to "drown out" a neighboring spatial frequency. Accordingly, the SMR of the neighboring spatial frequency will increase such that it need not be finely quantized.

The normalization function 130 analyzes the signal amplitude of the video transform samples in each spatial frequency to determine a scale factor for each spatial frequency. The scale factor, which is based on the maximum of the absolute values of the video transform samples, is then used to normalize the transform samples. The scale factors are ultimately provided with the encoded digital video signal so that full reconstruction of the video signal can occur at a receiver.

The scale factors, which represent the dynamic range of the spectral envelope for each spatial frequency, are encoded separately from the transform samples. Because of the limits of human visual perception, this allows the transform samples to be quantized relatively coarsely with fewer bits than the baseband waveform samples. The spectral envelope information (scaling factors) can also be coded relatively coarsely and do not have to be updated as often as the transform samples. This results in a significant bit rate reduction (i.e., compression).

The normalized transform samples are provided along with the scale factors to a bit allocation and quantization function 140 via line 135. The SMR from the psycho-visual model 160 is provided to the bit allocation and quantization function 140 via line 165. The bit allocation and quantization function 140 determines the number of bits which will be used to represent the quantized transform samples. Bit allocation must be sufficient so that quantization noise does not exceed the SMR, but not so great that a maximum encoding bit rate threshold is exceeded.

Typically, roughly 75% of the transform samples from a macroblock are zero or are quantized to zero. For the non-zero transform samples, up to eight or ten bits can be allocated per sample. For example, when up to eight bits are allocated to a luminance (Y) data sample, the sample is quantized to one of $2^8=256$ quantization levels. Up to eight bits may also be allocated to each of the chrominance components U and V. For studio quality applications, up to ten bits may be allocated per pixel component. A four-bit code corresponding to the bit allocation in each spatial frequency is determined, and ultimately transmitted along with the encoded transform data samples to allow inverse quantization of the signal at a receiver. An average bit allocation over the macroblock of about 0.5 to 1.0 bits per subband (e.g., spatial frequency) may be realized.

The sixty-four quantized data samples are Be provided to a bitstream formatting and encoder function 150 via line 145. Here, the transform samples, scale factors, and bit allocation codes are encoded in packets or frames of data. Each transform sample can be encoded using conventional modulation techniques such as PCM. Additional compression techniques including Huffman coding may also be employed to represent the quantized samples. In particular, run length coding of strings of zero transform samples can be performed. The encoded compressed digital data stream is output from the psycho-visual encoder 100 via line 170.

Figure 2:
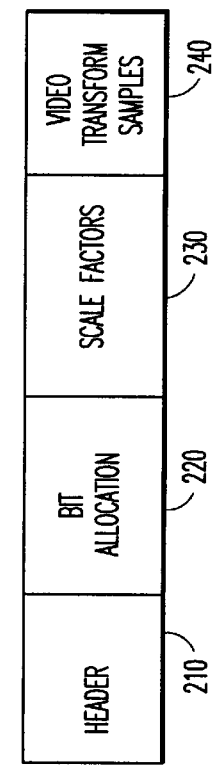
FIG. 2 is a diagrammatic illustration of the conventional frame formatting of a subband coded digital video signal that may be provided as the input to the post-compression hidden data transport system in accordance with the present invention.

FIG. 2 is a diagrammatic illustration of the conventional frame formatting of a subband coded digital video signal that may be provided as the input to the post-compression hidden data transport system in accordance with the present invention. The format shown in FIG. 2 is only one possible example of various formats that could be provided. In the example discussed, each of the sixty-four spatial frequencies contains one video transform data sample. Accordingly, each frame will contain up to sixty-four video transform samples.

The frame 250 includes a header portion 210 which identifies the beginning of the frame and may. have other information such as a sequence number, synchronization data, and sample rate data. The frame 250 also includes a bit allocation code portion 220 which indicates the starting position of the data and how many bits are used. The frame 250 further includes a scale factor portion 230 which indicates the dynamic range of the subband samples, and, a subband (e.g., transform) data sample portion 240. In alternative schemes, video data from more than one channel may be carried in a single frame.

Figure 3A:
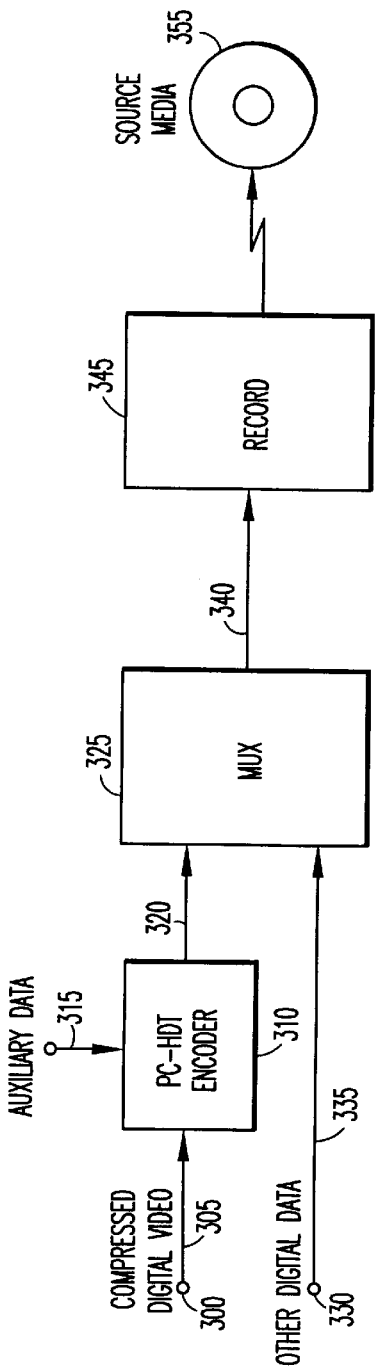
FIG. 3a is a block diagram of a first representative application of the post-compression hidden data transport encoder for video in accordance with the present invention.

FIG. 3a is a block diagram of a first representative application of the post-compression hidden data transport encoder for video in accordance with the present invention.

A demultiplexer (not shown) separates digital video and other digital signals from a multiplexed bitstream. The compressed digitized video data stream is then provided to the PC-HDT encoder 310 via input terminal 300 and line 305. The PC-HDT encoder 310 also receives auxiliary data which is to be embedded in the video signal via line 315. A combined signal representing auxiliary data subband samples and video data subband samples is provided via line 320 to a multiplexer 325. Other digital data (e.g., audio, computer software) is shown being provided via input terminal 330 and line 335 to the multiplexer 325, where the video and other digital data signals are multiplexed into a single multi-channel data stream at line 340. The PC-HDT encoder 310 can delay the digital video signal relative to the other digital data signal. This can be accounted for by using conventional techniques, such as synchronization means included with the multiplexer 325.

Furthermore, although only one video and one other digital data signal are shown, several channels may be provided concurrently. For example, the multiplexed signal at line 340 may include several programs including both video and accompanying audio and/or data (e.g., for alternate language viewers and teletext for the hearing impaired), video-only programming, and various data-only programming (e.g., stock price data, weather data).

The multiplexed digital data stream is provided via line 340 to a video recording device 345, where the data is written to source media 355 such as a CD, DVD, or DVC. The source medium 355 may be a master copy that is used, in turn, to record to other media for widespread distribution.

Figure 3B:
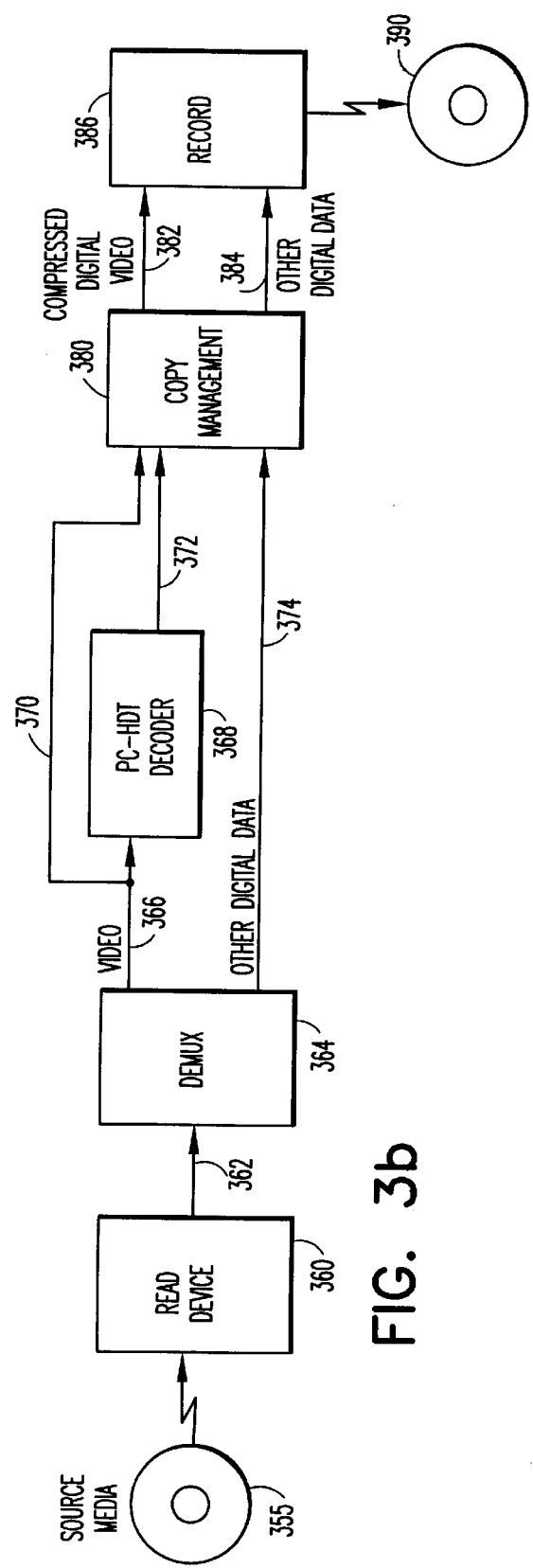
FIG. 3b is a block diagram of a second representative application of the post-compression hidden data transport decoder for video in accordance with the present invention.

FIG. 3b is a block diagram of a second representative application of the post-compression hidden data transport decoder for video in accordance with the present invention. The source media 355 including the digitized video signal with hidden auxiliary data is provided to a read device 360, which may include, for example, a DVD player. The read device 360 reads the storage medium 355 and outputs a digital data stream to a demultiplexer 364 via line 362. The demultiplexer 364 separates the video data stream with hidden auxiliary data from the audio or other digital data, and may include synchronization means to account for the delay in the video signal caused by the PC-HDT decoder 368. The video data is provided via line 366 to the PC-HDT decoder 368 of the present invention, and to a copy management function 380 via bypass line 370.

At the PC-HDT decoder 368, the auxiliary data is retrieved from the video data stream, and provided to the copy management function 380 via line 372. The other data is provided to the copy management or control function 380 via line 374. The copy management function 380 uses the auxiliary data to determine whether a copy may be made of the digital signals from the source media 355. If so, the video signal with hidden auxiliary data is provided to a video recording device 386 via line 382, and the other data signal is provided to the recording device 386 via line 384. A new source medium 390 encoded with the digital data from the master source medium 355 is provided via line 388 from the recording device 386.

Note that the new source media 390 is also encoded with the hidden auxiliary data. Therefore, the new source media 390 will also be subject to the copy management function 380 of the decoder. In this, way, the distributor can control whether the original source media can be duplicated. For instance, a distributor may provide auxiliary data that can be used to prevent copying of the source media in order to protect proprietary information. Alternatively, the distributor may provide auxiliary data that allows copying of source media such as promotional or demonstration material that is designed to encourage a consumer to purchase additional protected source media.

An additional representative application of the present invention is with a broadcast signal such as a television signal provided via a satellite or cable communication path. For example, a digital audio soundtrack may be provided which accompanies a television program such as a movie or other special event. The multiplexed digital signal, or transport data stream, which can comprise several hundred channels of digital information, is received by an individual in his home via a Direct Broadcast Satellite (DBS) system or via a cable communication path or the like.

The present invention can be employed to provide copy protection of these digital programming services by precluding the individual from recording the digital data on a device such as a DVD or DVC which is equipped with the PC-HDT decoder. Specifically, the PC-HDT encoder of the present invention can be used to encode hidden auxiliary data in the video portion of the transport data stream. Moreover, the hidden auxiliary data may be embedded prior to broadcast or at some intermediate point, and does not interfere with other data carried in the data stream. For example, a cable headend operator may receive digital programming via satellite, and embed the received signal with the hidden auxiliary data prior to distribution via the cable network.

When the combined digital video and auxiliary data signal is received by an individual along with other accompanying data, the data is decoded and unscrambled by a set-top box which communicates with a user's television and high-fidelity stereo system. Such set-top devices are typically provided by the cable television operator or DBS service provider as part of a service agreement. The set-top box decompresses and decodes the video signal and associated audio, data or other signal, if any, and reproduces them for the user's listening and viewing enjoyment. Since the auxiliary data signal is invisible relative to the normal video, the auxiliary data signal will not be detected by the viewer.

However, the auxiliary data signal remains embedded in the video signal. The auxiliary data signal can be used with appropriate circuitry, for example, to prevent the user from copying the signal on a recording device that is equipped with the PC-HDT decoder of the present invention. Alternatively, even if an individual records the signal on a conventional recording device such as a magnetic tape recorder, the auxiliary data signal remains embedded, and thus acts as an identification mark that can be used to verify the authenticity of any subsequent copy. This is helpful in thwarting "pirates" who duplicate and distribute programming without authorization.

Furthermore, in a point-to-point distribution system, wherein video data is transmitted separately to individuals, the auxiliary data signal can represent a unique identification number, such as an order number or customer number. This information may allow the identification of an individual pirate from a subsequent illicit copy of the audio signal.

Figure 4:
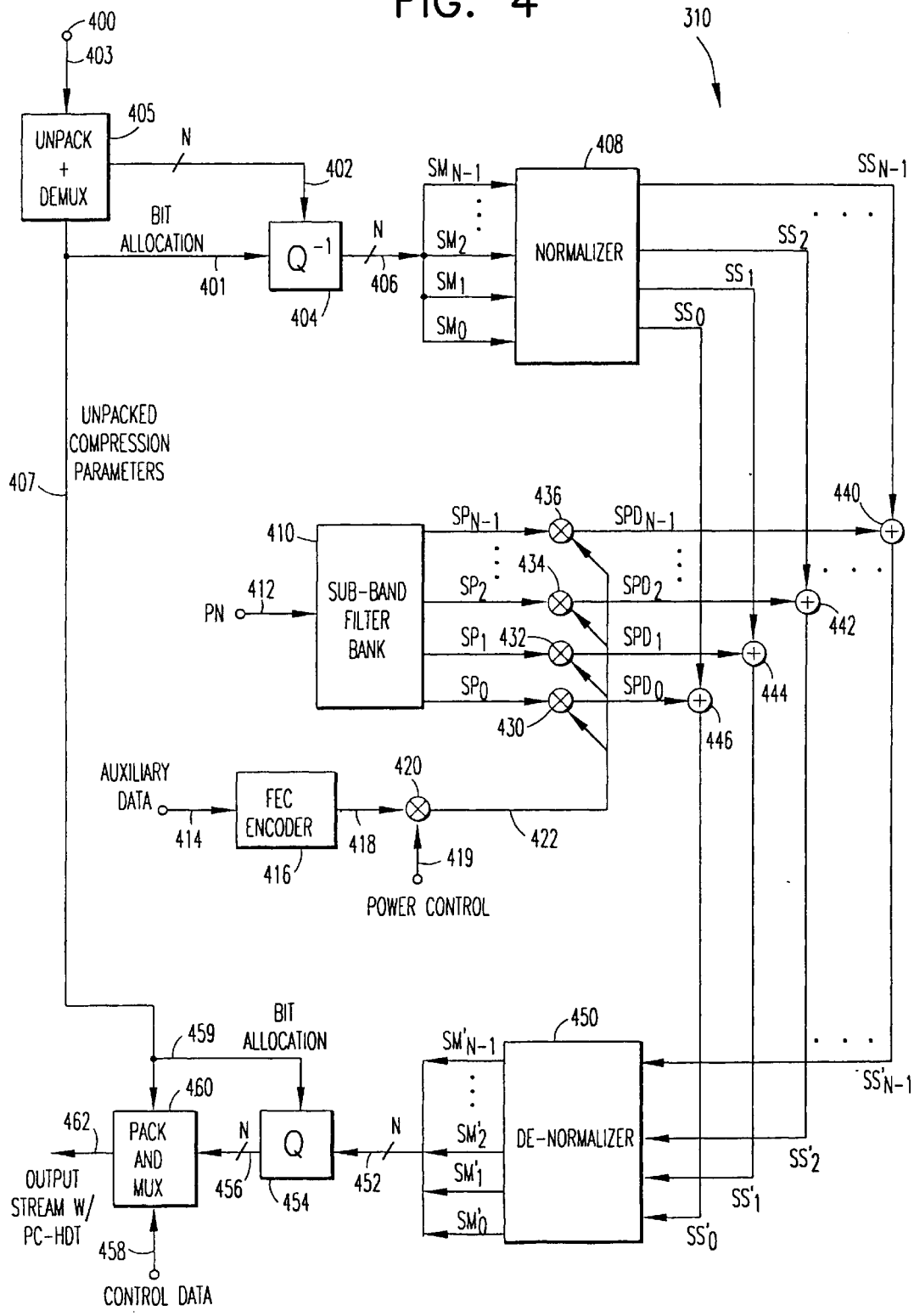
FIG. 4 is a block diagram of a post-compression hidden data transport system encoder in accordance with the present invention.

FIG. 4 is a block diagram of a post-compression hidden data transport (PC-HDT) system encoder 310 in accordance with the present invention. The encoder is suitable for encoding auxiliary data in both audio and video signals. The PC-HDT embeds imperceptible auxiliary data in a subband-encoded compressed digital audio or video signal without the need to fully decompress the signal. A pre-existing digital bitstream including compressed digital audio or video data is received by the encoder at terminal 400, and provided to a demultiplexer and unpack (e.g., unpacketize) function 405 via line 403.

The demultiplexer and unpack function 405 demultiplexes frames or packets of digital audio or video data from the remainder of the signal. The various portions of the audio or video frame are also unpacked. For instance, referring to FIG. 2, the bit allocation data 220 is unpacked from the frame 250 and provided to an inverse quantizer 404 via line 401. The audio or video subband samples 240 are unpacked and provided to the inverse quantizer 404 via line 402.

Commonly, when the audio or video subband samples are normalized before entering the bitstream, the subband samples are encoded as a decimal number with a mantissa and exponent portion, wherein the mantissa represents the audio subband data samples, and the exponent represents the scaling factors (e.g., spectral envelope information) for each subband. In this case, only the mantissa of the subband samples need be provided to the inverse quantizer 404 via line 402.

The inverse quantizer 404 performs different functions depending on the format of the packetized data stream. For example, the subband samples typically comprise binary data which may be in a sign and magnitude representation, or in a two's complement representation. The subband samples are converted to a two's complement representation if not already provided as such.

Furthermore, in the video example discussed in connection with FIG. 1, data samples from sixty-four subbands (e.g., spatial frequencies) are provided. Accordingly, lines 402 and 406, designated with the letter "N", each represent N=64 separate communication lines.

The subbands of audio or video data samples after inverse quantization are communicated to lines 406 which are also illustrated as individual lines $SM_0, SM_1, SM_2, \ldots, SM_{N-1}$. The designation "SM" indicates that the mantissa of the subband samples is being provided. A normalizer 408 is optionally provided in the event that the subband samples are not already normalized. The normalizer 408 computes the average energy over a small number of samples and divides each individual sample by the square root of the average energy, to provide a uniform power spectrum across all subbands.

Normalized audio or video subband samples are provided on the N lines designated by $SS_0, SS_1, SS_2, \ldots, SS_{N-1}$. The normalized subband samples are then combined with auxiliary data subband samples $SPD_0, SPD_1, SPD_2, \ldots, SPD_{N-1}$ at combiners 446, 444, 442, and 440, respectively. The combiners may comprise, for example, adders. Specifically, $SS_0$ is combined with $SPD_0$ at combiner 446, $SS_1$ is combined with $SPD_1$ at combiner 444, $SS_2$ is combined with $SPD_2$ at combiner 442, and $SS_{N-1}$ is combined with $SPD_{N-1}$ at combiner 440. The remaining audio or video subband samples and auxiliary data subband samples (not separately shown) are combined in a similar manner.

The auxiliary data subband samples $SPD_0, SPD_1, SPD_2, \ldots, SPD_{N-1}$ can be spread spectrum signals which are generated from a subband filtered pseudo-noise (PN) sequence and from an auxiliary data waveform. In particular, a PN sequence is provided to a subband filter bank 410 via line 412. The PN sequence may be binary or M-ary with M>2, or virtually any sequence which approximates a white noise signal. Furthermore, the PN sequence can include multiple discrete values or continuous values. The subband filter bank corresponds to the subband filter bank used to filter the digital video e.g., DCT function 120 shown in FIG. 1. The auxiliary data signal is provided via line 414 to a conventional forward error correction (FEC) encoder 416, which, while not required, provides redundant data bits in the auxiliary data stream for downstream error recovery.

Note that the data rate of the auxiliary data subband samples is significantly slower than that of the audio or video subband samples. With video, for example, an analog NTSC format television signal can be digitized into VGA resolution pictures which are 480×640 pixels, and which are transmitted at approximately 30 frames/second. Therefore, each frame has 480×640=307,200 samples (e.g., pixels). Then, assuming a visibility threshold of 30 dB and a desired auxiliary signal gain of 10 dB, a processing gain $G_p$ of 40 dB is necessary. The processing gain in dB is related to the spread rate by the equation $10\ \log_{10}$(spread rate)=Gp (dB). Thus, each auxiliary data bit must be spread over 10,000 pixels (e.g., video transform samples) to achieve $G_p$=40 dB, thereby resulting in 307,200/10,000=30.7 auxiliary data bits per frame, or 30.7 bits/frame×30 frames/sec.=921 bps. Further, assuming a rate R=½ FEC encoder is used, the auxiliary data bit rate that can be accommodated is roughly 921/2 bps=460 bps.

The FEC-encoded auxiliary data signal is provided via lines 418 and 422 to a plurality of modulators 430, 432, 434 and 436, which modulate the data carrier subband samples $SP_0$, SPE, $SP_2$, . . . , $SP_{N-1}$ to provide the auxiliary data subband sample sequences $SPD_0$, $SPD_1$, $SPD_2$, . . . , $SPD_{N-1}$, respectively, which carry the auxiliary data subband samples.

A power control signal is optionally provided via line 419 to modulator 420 to adjust the power of the auxiliary data signal carried on line 418. The power control signal ensures that the auxiliary data signal is below the noise quantization floor of the audio or video subband samples, and can account for possible nonlinearities in the subsequent quantizer 454 near zero so that the auxiliary signal is adequately quantized. For example, the power control may maintain a signal-to-quantization noise energy ratio (SNR) of 30, or a power ratio of 1,000.

The modulated auxiliary data spread spectrum signals $SPD_0$, $SPD_1$, $SPD_2$, . . . , $SPD_{N-1}$ and the audio or video subband samples $SS_0$, $SS_1$, $SS_2$, . . . , $SS_{N-1}$ combine to produce combined samples $SS'_0$, $SS'_1$, $SS'_2$, . . . , $SS'_{N-1}$, respectively, in which the auxiliary data subband samples are carried substantially imperceptibly (e.g., invisibly) in the video case. Generally, an increasing amount of distortion will be present when the data rate of the auxiliary signal is increased.

The combined samples are provided to an optional de-normalizer 450, which performs operations that are inverse to those of the normalizer 408 in order to restore the power spectrum of the audio or video subband samples in the combined samples. Moreover, the de-normalizer 450 may retrieve normalization data (scaling factors) obtained from the normalizer 408 and stored temporarily in a memory (not shown).

Note that, in accordance with the present invention, the de-normalizer 450 spectrally shapes the auxiliary data subband samples in the combined samples $SS'_0$, $SS'_1$, $SS'_2$, . . . , $SS'_{N-1}$ according to the power spectrum of the audio or video data. This spectral shaping advantageously enhances the concealment of the auxiliary data.

In the event that the audio or video subband samples are already normalized when received at terminal 400, the auxiliary data will be spectrally shaped according to the power spectrum of the audio or video data when the combined signal is decompressed and demodulated to baseband.

In either case, then, de-normalized combined subband samples $SM'_0$, $SM'_1$, $SM'_2$, . . . , $SM'_{N-1}$ are provided via lines 452 to quantizer 454. Quantizer 454 quantizes the combined samples using bit allocation data provided via lines 407 and 459 to provide quantized data at line 456. The quantized data, the unpacked compression parameters provided on line 407, and the control data on line 458 are packed into a new frame. Alternately, the same frame can be provided with the quantized data instead of creating a new frame. The control data includes, for example, synchronization data and cyclic redundancy check (CRC) bits. The new frame is provided via line 462 for transmission to a decoder. The PC-HDT encoder disclosed therefore is fully compatible with existing packet formats and protocols.

Alternatively, subband samples representing different auxiliary data signals can be carried in different subbands. The data samples in the different subbands can be generated using the same PN sequence, a time-shifted version of the same PN sequence, different PN sequences, or any combination thereof. Moreover, samples from more than one auxiliary data signal can be carried in any of the subbands. This technique, known as "layering," can be accomplished by carrying auxiliary data subband samples which were generated using a time-shifted version of the same PN sequence, different PN sequences or any combination thereof.

Furthermore, it is not required that all subbands carry auxiliary data subband samples. For example, it may be desirable to combine selected ones of the subband filtered PN sequences $SP_0$, $SP_1$, $SP_2$, . . . , $SP_{N-1}$ directly with corresponding ones of the audio or video subband samples $SS_0$, $SS_1$, $SS_2$, . . . , $SS_{N-1}$ to produce the combined samples $SS'_0$, $SS'_1$, $SS'_2$, . . . , $SS'_{N-1}$. In this manner, the selected subband filtered PN sequence bypasses modulation by the auxiliary data signal. This may be advantageous, for example, in providing a reference signal or other information to a decoder.

Moreover, since the PN period is finite and the characteristics of the subband filter bank 410 are known, the subband filtered PN sequences $SP_0$, $SP_1$, $SP_2$, . . . , $SP_{N-1}$ can be pre-computed and stored in a lookup table. And, when the PC-HDT encoder adds known data repeatedly, the auxiliary data subband samples $SPD_0$, $SPD_1$, $SPD_2$, . . . , $SPD_{N-1}$ can also be precomputed and stored. In this manner, implementation of the PC-HDT encoder of the present invention can be simplified and computational requirements reduced.

Figure 5:
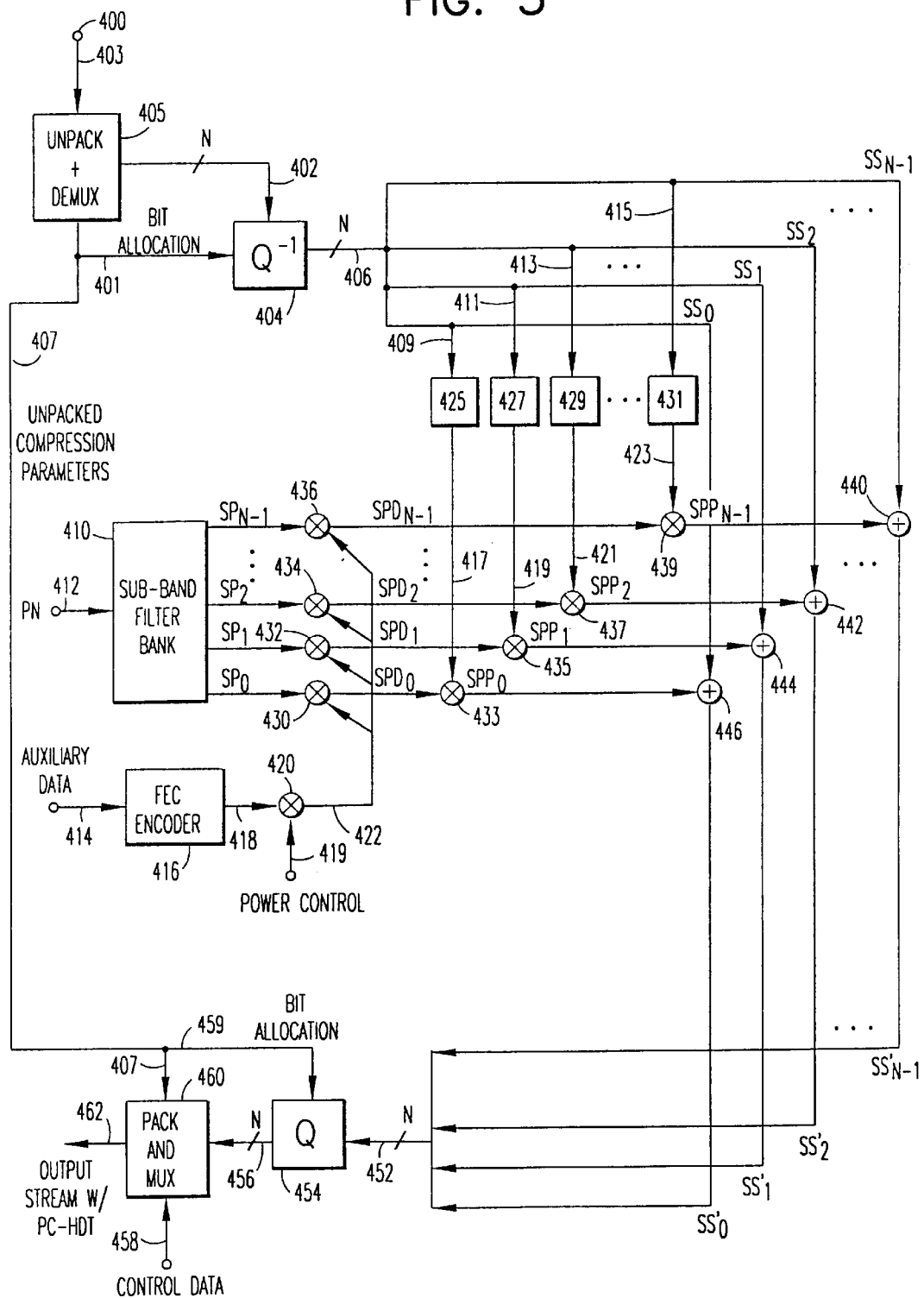
FIG. 5 is a block diagram of an alternate embodiment of a post-compression hidden data transport system encoder in accordance with the present invention.

FIG. 5 is a block diagram of an alternate embodiment of the post-compression hidden data transport system encoder in accordance with the present invention. The encoder is suitable for encoding auxiliary data in both audio and video signals. Elements of FIG. 5 correspond to like-numbered elements of FIG. 4, unless stated otherwise. In this embodiment, the subband samples $SS_0$, $SS_1$, $SS_2$, . . . , $SS_{N-1}$ provided via lines 406 have nonuniform power spectrums. Accordingly, in order to shape the auxiliary data subband samples $SPD_0$, $SPD_1$, $SPD_2$, . . . , $SPD_{N-1}$ to the spectrum of the audio or video subband samples, the audio or video subband samples are provided to subband power controllers (SPCs) 425, 427, 429 and 431 via lines 409, 411, 413 and 415, respectively.

The SPCs determine power modulation signals (P) based on the desired signal-to-noise ratio (SNR) of the auxiliary data subband samples to the audio or video data subband samples in each subband, and the square root of the average of the square of the amplitude SS(i) of each of the M audio or video subband samples. That is, for each subband j, $$P_j = SNR \cdot \sqrt{\frac{1}{M} \sum_{i=1}^{M} SS_j(i)^2}$$

The power modulation signals are provided to modulators 433, 435, 437 and 439 via lines 417, 419, 421 and 423, respectively. At the modulators 433, 435, 437 and 439, the power of the auxiliary data subband samples $SPD_0$, $SPD_1$, $SPD_2$, ..., $SPD_{N-1}$ is adjusted, thereby resulting in power-adjusted auxiliary data subband samples $SPP_0$, $SPP_1$, $SPP_2$, ..., $SPP_{N-1}$. The power-adjusted auxiliary data subband samples, which are spectrally shaped according to the audio or video subband samples, are then combined with the audio or video subband samples $SS_0$, $SS_1$, $SS_2$, ..., $SS_{N-1}$, at combiners (e.g., adders) 446, 444, 442 and 440, respectively, to provide the combined samples $SS'_0$, $SS'_1$, $SS'_2$, ..., $SS'_{N-1}$. The quantized data, the unpacked compression parameters provided on line 407, and the control data on line 458 are packed into a new frame, and provided via line 462 for transmission to a decoder.

In fact, the embodiment of FIG. 5 can result in significant computational savings when the audio or video subband samples are not normalized. This can be seen by noting that normalization and de-normalization of the audio or video subband samples requires a total of 2N operations, while power-adjustment via the subband power control requires only N operations (where N=number of subbands). Computations are thus reduced by 50% when the SPCs of FIG. 5 are employed.

Figure 6:
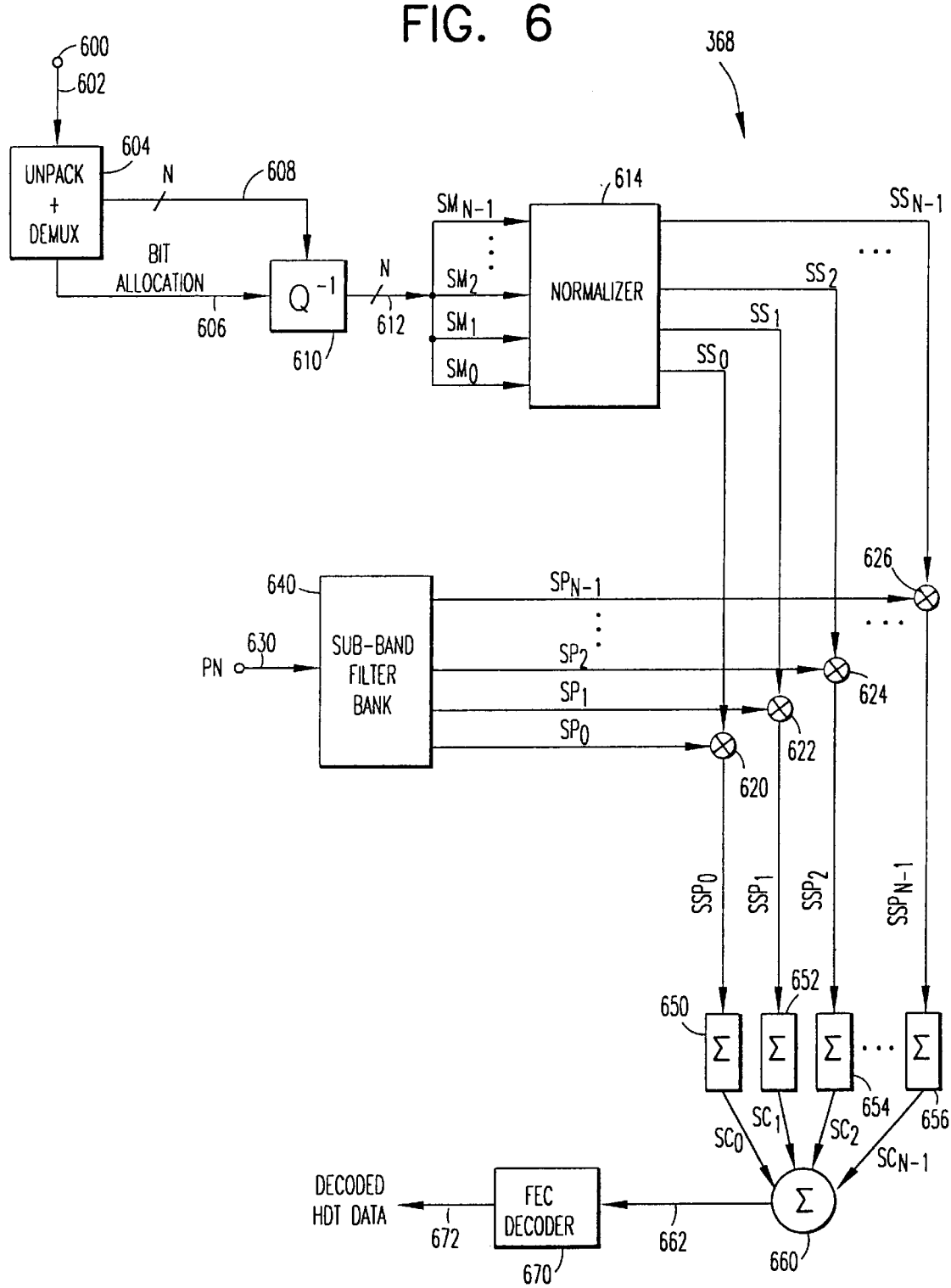
FIG. 6 is a block diagram of a post-compression hidden data transport system decoder in accordance with the present invention.

FIG. 6 is a block diagram of the post-compression hidden data transport system decoder in accordance with the present invention. The decoder is suitable for recovering auxiliary data from both audio and video signals. The compressed digital packetized stream is received at input terminal 600 of the decoder 368 and provided to an unpack and demultiplex function 604 via line 602. An inverse quantizer 610 receives the subband samples via lines 608 and the bit allocation data via line 606. Inverse quantized subband samples $SM'_0$, $SM'_1$, $SM'_2$, ..., $SM'_{N-1}$ are provided via lines 612. If these subband samples are not already normalized, they are normalized at a normalizer 614 to provide an approximately uniform power spectrum across all subbands. If the scale factors 230 are provided in the data stream, the subband samples can be rescaled (e.g., normalized) at the quantizer 610.

If the audio or video subband samples in the combined subband samples $SM'_0$, $SM'_1$, $SM'_2$, ..., $SM'_{N-1}$ are already normalized, the normalizer 614 is not required. The normalized subband samples $SS_0$, $SS_1$, $SS_2$, ..., $SS_{N-1}$ are combined with recovery data carrier sequences $SP_0$, $SP_1$, $SP_2$, ..., $SP_{N-1}$ at demodulators (e.g., mixers) 620, 622, 624 and 626, respectively.

The sequences $SP_0$, $SP_1$, $SP_2$, ..., $SP_{N-1}$ in this embodiment are spread spectrum carrier signals generated from a subband filtered pseudo-noise (PN) sequence corresponding to the PN sequence used at the PC-HDT encoder. The PN sequence is provided via line 630 to a subband filter bank 640, which corresponds to the subband filter bank of the encoder. The filtered PN sequences $SP_0$, $SP_1$, $SP_2$, ..., $SP_{N-1}$ are provided to the demodulators 620, 622, 624 and 626, respectively. As with the PC-HDT encoder, these sequences can be pre-computed and stored in a lookup table at the decoder to reduce computational requirements.

Samples $SSP_0$, $SSP_1$, $SSP_2$, ..., $SSP_{N-1}$ formed from the product of the filtered PN sequences and the combined subband samples are provided to integrators 650, 652, 654 and 656, respectively. By integrating the data in each of the subbands over L consecutive samples, despreading of the auxiliary signal in each subband is achieved. Essentially, despreading is achieved by the combination of mixing and integrating. The number of samples L for the integration should be selected such that L×N (i.e., processing gain) is greater than the SNR of the PN sequence to the audio or video subband samples before integrating $SSP_0$, $SSP_1$, $SSP_2$, ..., $SSP_{N-1}$.

The despread auxiliary data samples $SC_0$, $SC_1$, $SC_2$, ..., $SC_{N-1}$ are provided to a summer 660 and summed across the N subbands to recover the encoded auxiliary data samples at line 662. Moreover, the SNR of the PN sequence to the or video or audio subband samples after despreading can be increased by increasing the number of subbands N, since the SNR is proportional to the square root of N. An FEC decoder 670 decodes the auxiliary data samples of line 662 and corrects channel errors, thereby providing decoded auxiliary data at line 672.

The decoded auxiliary data can then be used in a variety of applications. For example, the auxiliary data can be provided to a copy management device to control the reproduction of the audio, video and associated data signals.

The aforementioned recovery and despread process is modified slightly when auxiliary data subband samples from different auxiliary signals are carried in the different subbands, or when auxiliary data subband samples from more than one auxiliary signal is carried in one subband. Both partial and fully overlapping situations are also possible, along with various combinations of the above cases. Generally, however, the PC-HDT decoder provides operations which are inverse to those of the PC-HDT encoder. For instance, if auxiliary data subband samples corresponding to different auxiliary signals are carried in the combined subbands samples, then the integration must be modified from the embodiment of FIG. 6 such that only common auxiliary data samples are summed together. Similarly, if auxiliary data subband samples are encoded using different PN sequences, time-shifted versions of the same PN sequence, or any combination thereof, the subband filtered PN sequences $SP_0$, $SP_1$, $SP_2$, ..., $SP_{N-1}$ must be generated using a corresponding PN sequence.

Alternatively, the FEC decoder 670 may be replaced by a threshold device that detects the energy in the auxiliary signal of line 662, and compares that energy to a suitable threshold. Thus, the decoder can determine whether an auxiliary signal is present without having to perform FEC decoding. Moreover, to increase detection accuracy, the decoder can examine a sequence of auxiliary data values before declaring a detection. Detection can be further facilitated if the encoder uses a unique pattern for the auxiliary data.

Additionally, acquisition of the compressed digital audio or video bitstream and synchronization with the subband filtered PN sequences $SP_0$, $SP_1$, $SP_2$, ..., $SP_{N-1}$ can be enhanced and simplified if the PN generator used to generate the PN sequence is locked in a predetermined pattern to the audio or video bitstream. That is, since many modern audio and video compressors utilize a frame structure wherein each frame of bits represents a fixed number of audio or video samples, there are a fixed number of frames in a given time period. Thus, by choosing a repetition period for the filtered PN sequences that is an integer multiple of the audio or video data frame period, the number of PN sequence hypotheses required to demodulate the auxiliary signal is reduced. For example, if the PN sequence period has a duration of 4096 samples and the frame period has a duration of 256 samples, then only 4096/256=16 hypotheses have to be tested for each subband.

In yet another alternate embodiment of the PC-HDT decoder of FIG. 6, which may be used in conjunction with the PC-HDT encoder of FIG. 5, where the recovered auxiliary data subband samples have a nonuniform power spectrum, it may be desirable to normalize the power spectrum across all the subbands in which the auxiliary data subband samples are carried prior to integration. This can be accomplished by adjusting the power of the subband filtered PN sequences $SP_0, SP_1, SP_2, \ldots, SP_{N-1}$ using controllers similar to the SPCs 425, 427, 429 and 431 of FIG. 5.

Figure 7:
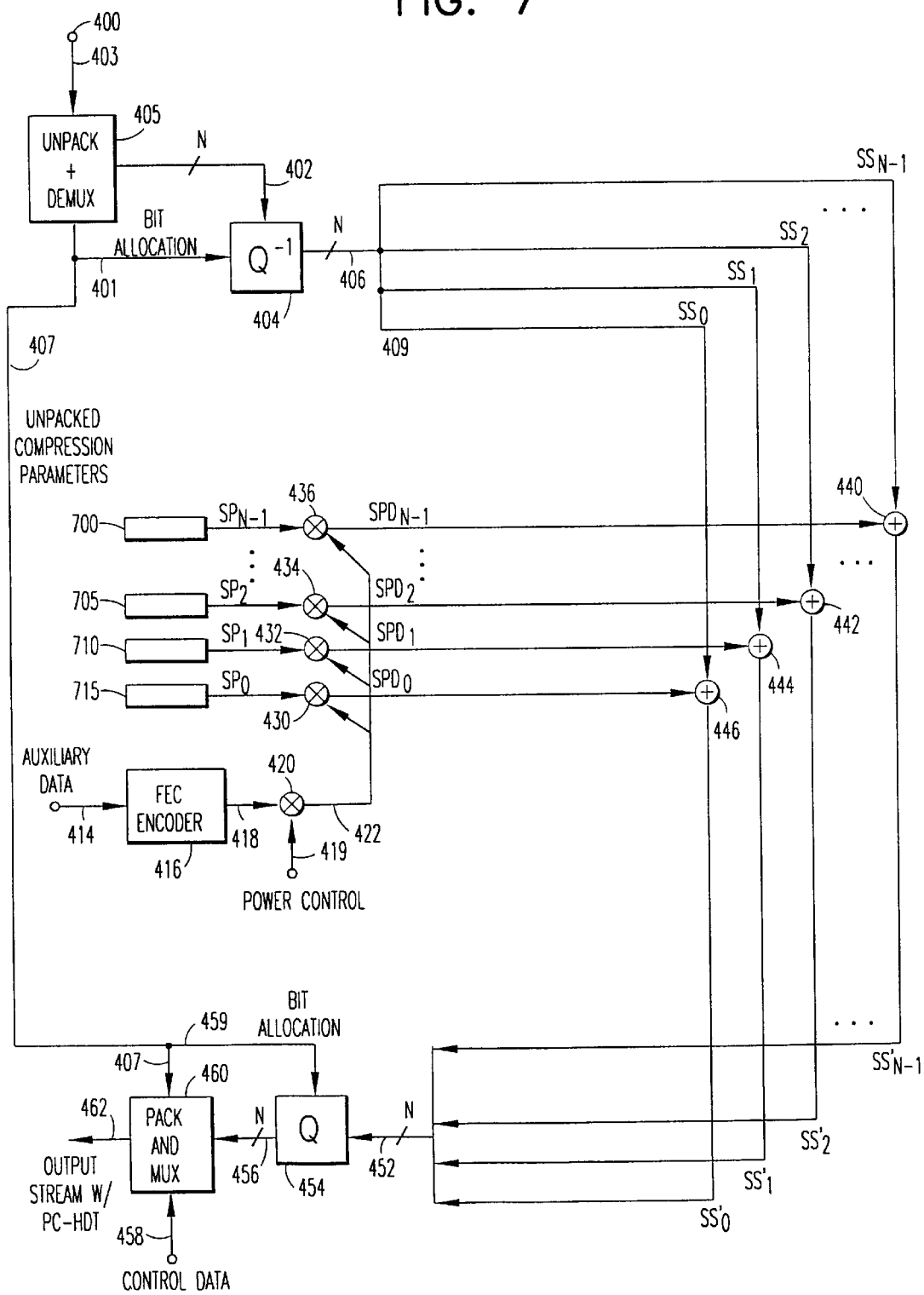
FIG. 7 is a block diagram of another alternate embodiment of a post-compression hidden data transport system encoder in accordance with the present invention.

FIG. 7 is a block diagram of another alternate embodiment of a post-compression hidden data transport system encoder in accordance with the present invention. The decoder is suitable for recovering auxiliary data from both audio and video signals. Elements of FIG. 7 correspond to like-numbered elements of FIG. 4, unless stated otherwise. In this embodiment, the combined subband samples $SS_0, SS_1, SS_2, \ldots, SS_{N-1}$ provided via lines 406 have uniform power spectrums. However, instead of providing subband filtered spread spectrum PN sequences, which are generated from a pseudo-randomly varying sequence of values with magnitude +1 or −1, the sequences $SP_0, SP_1, SP_2, \ldots, SP_{N-1}$ are provided as "sparse" PN sequences.

With a sparse PN sequence, a pseudo-random sequence is generated which comprises mostly zeros, but with values of +1 and −1, for example, randomly interspersed. The sparse PN sequence is added at specific locations known to the PC-HDT encoder and decoder. A sparse PN sequence results in a lower data rate since the processing gain $G_p$ is reduced in proportion to the average occurrence of non-zero samples. For example, if the sparse PN sequence has one value in ten which is non-zero, the processing gain $G_p$ is reduced by a factor of ten relative to a regular PN sequence. However, advantageously, degradation of the audio or video subband samples and implementation complexity is also reduced. Moreover, even though a lower data rate results, this may be acceptable in certain situations, such as when the presence or absence of the auxiliary data itself is the only concern.

In accordance with this embodiment of the present invention, sparse PN sequence generators 715, 710, 705 and 700 are provided. Corresponding sparse PN sequences $SP_0, SP_1, SP_2, \ldots, SP_{N-1}$ are coupled to a plurality of modulators 430, 432, 434 and 436, respectively. The modulators modulate the sparse PN sequences $SP_0, SP_1, SP_2, \ldots, SP_{N-1}$ to provide the auxiliary data subband samples $SPD_0, SPD_1, SPD_2, \ldots, SPD_{N-1}$, respectively. The auxiliary data subband samples are then combined with the audio or video subband samples $SS_0, SS_1, SS_2, \ldots, SS_{N-1}$, at combiners 446, 444, 442 and 440, respectively, to provide the combined samples $SS'_0, SS'_1, SS'_2, \ldots, SS'_{N-1}$. The combined samples are then quantized, packed, and multiplexed into the new frame.

In alternative embodiments, sparse PN generators 700, 705, 710 and 715 may provide different sparse PN sequences, the same sparse PN sequence, time-shifted versions of the same sparse PN sequence, or any combination thereof. Similarly, selected ones of the modulators 430, 432, 434 and 436 may be bypassed such that some of the signals $SPD_0, SPD_1, SPD_2, \ldots, SPD_{N-1}$ do not carry auxiliary data.

In yet another embodiment of the present invention, both spread spectrum PN sequences and sparse PN sequences may be employed for carrying the auxiliary data subband samples. Spread spectrum PN sequences and sparse PN sequences may be employed concurrently or in a time-alternating manner in the same or different subbands. As an example, a first sequence of auxiliary data subband samples may be carried in a first subband by a spread spectrum PN sequence, while a second sequence of auxiliary data subband samples may be carried in a second subband by a sparse PN sequence.

Or, analogous to the layering scheme discussed previously, first and second auxiliary data subband sample sequences may be carried in the same subband by a spread spectrum PN sequence and a sparse PN sequence, respectively. Furthermore, in a time-division scheme, a given sequence of auxiliary data subband samples are first carried in a given subband by a spread spectrum PN sequence, and then (in the same subband) by a sparse PN sequence, and so forth. Alternately, a first sequence of auxiliary data subband samples can be carried by a spread spectrum PN sequence in a first subband, then in a second subband (by the same spread spectrum PN sequence), and so forth. Moreover, the same sequence, time-shifted versions of the same sequence, different sequences, or any combination thereof may be used in the various time segments.

Further still, the PC-HDT encoder may include decision means for switching between spread spectrum and sparse PN sequences. For example, it may be desirable to use sparse PN sequences when embedding auxiliary data in a quiet high-fidelity musical passage where distortion should be minimized, while spread spectrum PN sequences can be used for voice-only programs such as news reports where absolute fidelity is less important. In the case of video, it may be desirable to use sparse PN sequences when embedding auxiliary data in a pay per view movie, while spread spectrum PN sequences can be used for network broadcasts, cartoons or video games.

In yet another embodiment of the present invention, a "sample twiddling" sequence is generated in cooperation with the sparse PN sequence discussed above. Specifically, audio or video subband samples from the transport data stream are pseudo-randomly selected. For example, assume four bits in two's complement notation are used to represent a subband sample with value "+5" (e.g., 0101 in binary). Then, the current sparse PN sequence value, which is independently generated, is added to the subband sample to create a new data carrier sequence.

For example, if the current sparse PN sequence value is "−1", the modified subband sample will be 5−1=4 (0100 in binary). If the current sparse PN sequence value is "+1", the modified subband sample will be 5+1=6 (0110 in binary). Furthermore, if the current sparse PN sequence value is "0", the modified subband sample will be unchanged. Moreover, when four bits are allocated, the subband sample is constrained to take on values between "+7" and "−8" (e.g., between 0111 and 1000 in binary). Thus, if the current subband sample has a value "+7" and the current sparse PN sequence has a value "+1", the subband sample will not change. In the manner discussed previously, a sample twiddle sequence is generated and used to carry the auxiliary data subband samples. Moreover, with sample twiddling, the required inverse quantization steps are significantly reduced since there is no need to apply scale factors or an inverse quantization equation to the subband samples. The only requirement is that the subband samples be in a two's complement representation.

In still another embodiment of the present invention, a "bit twiddling" sequence is generated in cooperation with the sparse PN sequence discussed above. An audio or video subband sample from the transport data stream is pseudo-randomly selected. For example, assume again that four bits (in two's complement notation) are used to represent a subband sample with value "+5" (e.g., 0101 in binary). Then, the current status of the sparse PN sequence is added to the least significant bit (LSB) of the binary representation of the subband sample.

For instance, the least significant bit of the subband sample "0101" is "1". If the current sparse PN sequence value is "−1", the LSB of the modified subband sample is flipped to −1−1=0. If the current sparse PN sequence value is "+1", the modified subband sample will be unchanged since the LSB can only take on values of zero or one. Furthermore, if the LSB of the selected audio or video subband sample is "0", and the corresponding sparse PN sequence value has value "1", then the LSB of the sample is flipped to "1". If LSB=1 and the corresponding sparse PN sequence value has value "−1", then the LSB is flipped to "0". In other cases, including when the sparse PN sequence has value "0", the LSB of the subband sample is unchanged. The resulting bit twiddling sequence is modulated by the auxiliary data subband samples in the manner discussed previously. Moreover, with bit twiddling, the required inverse quantization steps can be eliminated since there is no need to provide the subband sample in a two's complement format, or to apply scale factors or an inverse quantization equation to the subband samples. This advantageously reduces implementation complexity.

Furthermore, sample twiddling and bit twiddling may be used in conjunction with the spread spectrum PN sequence and sparse PN sequence in the variations and combinations discussed herein.

Figure 8:
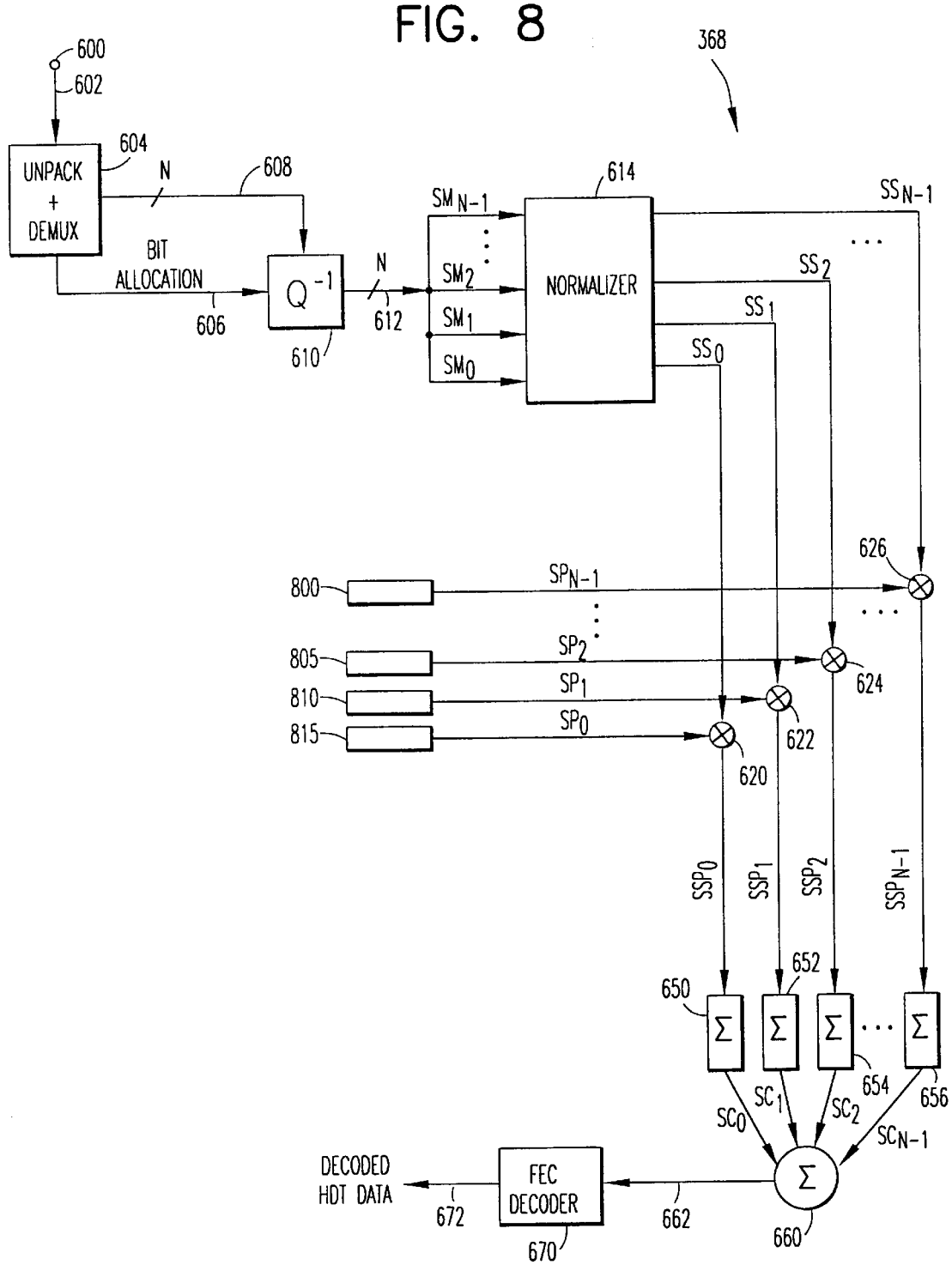
FIG. 8 is a block diagram of an alternate embodiment of a post-compression hidden data transport system decoder in accordance with the present invention.

FIG. 8 is a block diagram of an alternate embodiment of a post-compression hidden data transport system decoder in accordance with the present invention. The decoder is suitable for recovering auxiliary data from both audio and video signals. This decoder can be used in conjunction with the encoder of FIG. 7. Elements of FIG. 8 correspond to like-numbered elements of FIG. 6, unless stated otherwise. In this embodiment, the combined samples $SS'_0$, $SS'_1$, $SS'_2$, ..., $SS'_{N-1}$ on lines 612 include auxiliary data subband samples which were carried using sparse PN sequences. Accordingly, the same sparse PN sequences which were used by the encoder must be used by the decoder. Of course, if sample twiddling or bit twiddling sequences were used to carry the auxiliary data subband samples, corresponding demodulation sequences are required in the decoder.

Sparse PN sequence generators 815, 810, 805 and 800 provide sparse PN sequences $SP_0$, $SP_1$, $SP_2$, ..., $SP_{N-1}$ respectively. The sparse PN sequences $SP_0$, $SP_1$, $SP_2$, ..., $SP_{N-1}$ are used to demodulate the combined subband samples $SS'_0$, $SS'_1$, $SS'_2$, ..., $SS'_{N-1}$ at demodulators 620, 622, 624 and 626, respectively, to provide the auxiliary data subband samples $SSP_0$, $SSP_1$, $SSP_2$, ..., $SSP_{N-1}$. The auxiliary data samples are then despread by integrators 650, 652, 654 and 656, summed at summer 660, and provided to an FEC decoder 670 as discussed previously.

It should now be appreciated that the invention provides substantially inaudible or imperceptible auxiliary data subband samples in a pre-existing subband coded digital audio or video data stream, respectively. The auxiliary data subband samples are associated with spatial frequencies of video transform samples even though the auxiliary data itself may not have any spatial element. The terms video subband sample and video transform sample have been used interchangeably. Audio or video subband samples are retrieved from compressed, digitized audio or video data in a packetized stream and normalized, if necessary, prior to combination with auxiliary data subband samples. The auxiliary data subband samples are provided via subband filtered PN sequences, sparse PN sequences, sample twiddle sequences, or bit twiddle sequences, or combinations thereof. Moreover, not all of the audio or video subbands must carry the auxiliary data.

Combined subband samples which include the auxiliary data subband samples are de-normalized, if necessary, prior to recombination with the packetized stream as a new frame or as part of a pre-existing frame. The auxiliary data subband samples are spectrally shaped to the audio or video either during de-normalization, or during recovery to baseband of the digital audio or video data.

Although the invention has been described in connection with various specific embodiments, it will be appreciated by those skilled in the art that numerous adaptations and modifications may be made thereto without departing from the spirit and scope of the invention as set forth in the claims.

What is claimed is:

1. A method for providing auxiliary data subband samples in a compressed digital video data stream, comprising the steps of:

provinding a plurality of video transform samples from said data stream;

providing a data carrier sequence;

modulating said data carrier sequence by an auxiliary data signal to provide said auxiliary data subband samples;

combining said auxiliary data subband samples with corresponding video transform samples to produce combined transform samples in which said auxiliary data subband samples are carried substantially imperceptibly; and providing said combined transform samples for transport in said digital video data stream.

2. The method of claim 1, wherein said video transform samples have a nonuniform power spectrum, comprising the further steps of:

normalizing said video transform samples to provide an approximately uniform power spectrum thereof; and de-normalizing said combined transform samples subsequent to said normalizing step to restore said nonuniform power spectrum of said video transform samples, and to spectrally shape said auxiliary data subband samples in said combined transform samples according to said nonuniform power spectrum.

3. The method of claim 1, wherein said video transform samples have a nonuniform power spectrum, comprising the further step of:

spectrally shaping said auxiliary data subband samples according to said nonuniform power spectrum.

4. The method of claim 1, comprising the further steps of:

packetizing said combined transform samples; and multiplexing the packetized combined transform samples into a packetized transport stream.

5. The method of claim 1, wherein said data carrier sequence is modulated by different auxiliary data signals, thereby allowing combined transform samples in which respective auxiliary data subband samples corresponding to said different auxiliary data signals are carried.

6. The method of claim 1, wherein auxiliary data subband samples from a plurality of auxiliary data signals are carried in a spatial frequency of said video transform samples.

7. The method of claim 1, comprising the further steps of:

inverse quantizing said video transform samples;

quantizing said combined transform samples subsequent to said inverse quantizing step;

allocating bits for said inverse quantizing step; and allocating bits for said quantizing step according to a visibility threshold.

8. The method of claim 1, wherein said data carrier sequence comprises at least one of:

(a) a pseudo-noise (PN) sequence provided over at least one spatial frequency of said video transform samples;
(b) different PN transform sequences provided over one spatial frequency of said video transform samples;
(c) time-shifted versions of the same PN transform sequence provided over one spatial frequency of said video transform samples;
(d) a sparse PN sequence provided over at least one spatial frequency of said video transform samples;
(e) different sparse PN sequences provided over one spatial frequency of said video transform samples;
(f) time-shifted versions of the same sparse PN sequence provided over one spatial frequency of said video transform samples;
(g) a sample twiddling sequence provided over at least one spatial frequency of said video transform samples;
(h) different sample twiddling sequences provided over one spatial frequency of said video transform samples;
(i) time-shifted versions of the same sample twiddling sequence provided over one spatial frequency of said video transform samples;
(j) a bit twiddling sequence provided over at least one spatial frequency of said video transform samples;
(k) different bit twiddling sequences provided over one spatial frequency of said video transform samples; and
(l) time-shifted versions of the same bit twiddling sequence provided over one spatial frequency of said video transform samples.

9. The method of claim 1, comprising the further step of:
combining said data carrier sequence with said video transform samples to produce combined transform samples in which said data carrier sequence is carried substantially imperceptibly.

10. The method of claim 1, wherein said data carrier sequence is filtered over a plurality of spatial frequencies of said video transform samples.

11. The method of claim 1 wherein said auxiliary data subband samples are carried in a plurality of spatial frequencies of said combined transform samples.

12. The method of claim 1, wherein said video transform samples comprise spatially transformed pixel data from at least one of an intra coded image and a differentially coded image.

13. A method for recovering auxiliary data subband samples representative of an auxiliary data signal from a compressed digital video data stream, said auxiliary data subband samples being provided by modulating a first data carrier sequence by said auxiliary data signal, said auxiliary data subband samples being carried with video transform samples in combined transform samples in said data stream, comprising the steps of:
recovering said combined transform samples from said data stream;
providing a recovery data carrier sequence corresponding to said first data carrier sequence; and
processing said combined transform samples using said recovery data carrier sequence to recover said auxiliary data subband samples from said recovered combined transform samples.

14. The method of claim 13, wherein said recovery data carrier sequence comprises at least one of:
(a) a pseudo-noise (PN) sequence provided over at least one spatial frequency of said video transform samples;
(b) different PN transform sequences provided over one spatial frequency of said video transform samples;
(c) time-shifted versions of the same PN transform sequence provided over one spatial frequency of said video transform samples;
(d) a sparse PN sequence provided over at least one spatial frequency of said video transform samples;
(e) different sparse PN sequences provided over one spatial frequency of said video transform samples;
(f) time-shifted versions of the same sparse PN sequence provided over one spatial frequency of said video transform samples;
(g) a sample twiddling sequence provided over at least one spatial frequency of said video transform samples;
(h) different sample twiddling sequences provided over one spatial frequency of said video transform samples;
(i) time-shifted versions of the same sample twiddling sequence provided over one spatial frequency of said video transform samples;
(j) a bit twiddling sequence provided over at least one spatial frequency of said video transform samples;
(k) different bit twiddling sequences provided over one spatial frequency of said video transform samples; and
(l) time-shifted versions of the same bit twiddling sequence provided over one spatial frequency of said video transform samples.

15. The method of claim 13, wherein said processing step comprises the steps of:
demodulating said recovered combined transform samples using said recovery data carrier sequence to recover said auxiliary data subband samples; and
integrating said recovered auxiliary data subband samples to provide despread auxiliary data subband samples.

16. The method of claim 15, comprising the further step of:
summing said despread auxiliary data subband samples across selected spatial frequencies thereof to recover said auxiliary data signal.

17. The method of claim 13, wherein said video transform samples have a nonuniform power spectrum, comprising the further step of:
normalizing said combined transform samples to provide an approximately uniform power spectrum for said video transform samples in said combined transform samples.

18. The method of claim 13, comprising the further step of:
normalizing said combined transform samples to provide an approximately uniform power spectrum for said auxiliary data subband samples.

19. The method of claim 13, comprising the further step of:
inverse quantizing said combined transform samples; and
allocating bits for said inverse quantizing step.

20. The method of claim 13, wherein said recovery data carrier sequence is filtered over a plurality of spatial frequencies of said video transform samples.

21. The method of claim 13 wherein said auxiliary data subband samples are carried in a plurality of spatial frequencies of said combined transform samples.

22. The method of claim 13, wherein said video transform samples comprise spatially transformed pixel data from at least one of an intra coded image and a differentially coded image.

23. The method of claim 13, wherein auxiliary data subband samples corresponding to different auxiliary data signals are carried in said combined transform samples of said digital video data stream, comprising the further step of:

processing said combined transform samples using different recovery data carrier sequences.

24. An encoder for providing auxiliary data subband samples in a compressed digital video data stream, comprising:

an input terminal for receiving said digital video data stream and providing a plurality of video transform samples;

a data carrier generator for providing a data carrier sequence;

a modulator for modulating said data carrier sequence by an auxiliary data signal to provide said auxiliary data subband samples;

a combiner coupled to said modulator for combining said auxiliary data subband samples with corresponding video transform samples to produce combined transform samples in which said auxiliary data subband samples are carried substantially imperceptibly; and an output terminal coupled to said combiner for providing said combined transform samples for transport in said digital video data stream.

25. The encoder of claim 24, wherein said video transform samples have a nonuniform power spectrum, further comprising:

a normalizer for normalizing said video transform samples to provide an approximately uniform power spectrum thereof; and a de-normalizer for de-normalizing said combined transform samples subsequent to said normalizing step to restore said nonuniform power spectrum of said video transform sample, and to spectrally shape said auxiliary data subband samples in said combined transform samples according to said nonuniform power spectrum.

26. The encoder of claim 24, wherein said video transform samples have a nonuniform power spectrum, further comprising:

means for spectrally shaping said auxiliary data subband samples according to said nonuniform power spectrum.

27. The encoder of claim 24, further comprising:

a packetizer for packetizing said combined transform samples; and a multiplexer for multiplexing the packetized combined transform samples into a packetized transport stream.

28. The encoder of claim 24, wherein said data carrier sequence is modulated by different auxiliary data signals, thereby allowing combined transform samples in which respective auxiliary data subband samples corresponding to said different auxiliary data signals are carried.

29. The encoder of claim 24, wherein auxiliary data subband samples from a plurality of auxiliary data signals are carried in one associated spatial frequency of said combined transform samples.

30. The encoder of claim 24, further comprising:

an inverse quantizer for inverse quantizing said video transform samples;

a quantizer for quantizing said combined transform samples; and bit allocation means coupled to said inverse quantizer and said quantizer for allocating bits for said inverse quantizing step, and for allocating bits for said quantizing step according to a visibility threshold.

31. The encoder of claim 24, wherein said data carrier sequence comprises at least one of:

(a) a pseudo-noise (PN) sequence provided over at least one spatial frequency of said video transform samples;

(b) different PN transform sequences provided over one spatial frequency of said video transform samples;

(c) time-shifted versions of the same PN transform sequence provided over one spatial frequency of said video transform samples;

(d) a sparse PN sequence provided over at least one spatial frequency of said video transform samples;

(e) different sparse PN sequences provided over one spatial frequency of said video transform samples;

(f) time-shifted versions of the same sparse PN sequence provided over one spatial frequency of said video transform samples;

(g) a sample twiddling sequence provided over at least one spatial frequency of said video transform samples;

(h) different sample twiddling sequences provided over one spatial frequency of said video transform samples;

(i) time-shifted versions of the same sample twiddling sequence provided over one spatial frequency of said video transform samples;

(j) a bit twiddling sequence provided over at least one spatial frequency of said video transform samples;

(k) different bit twiddling sequences provided over one spatial frequency of said video transform samples; and (l) time-shifted versions of the same bit twiddling sequence provided over one spatial frequency of said video transform samples.

32. The encoder of claim 24, further comprising:

means for combining said data carrier sequence with said video transform samples to produce combined transform samples in which said data carrier sequence is carried substantially imperceptibly.

33. The encoder of claim 24, wherein said data carrier sequence is filtered over a plurality of spatial frequencies of said video transform samples.

34. The encoder of claim 24, wherein said auxiliary data subband samples are carried in a plurality of spatial frequencies of said combined transform samples.

35. The encoder of claim 24, wherein said video transform samples comprise spatially transformed pixel data from at least one of an intra coded image and a differentially coded image.

36. A decoder for recovering auxiliary data subband samples representative of an auxiliary data signal from a compressed digital video data stream, said auxiliary data subband samples being provided by modulating a first data carrier sequence by said auxiliary data signal, said auxiliary data subband samples being carried with video transform samples in combined transform samples in said compressed digital data stream, comprising:

means for recovering said combined transform samples from said data stream;

means for providing a recovery data carrier sequence corresponding to said first data carrier sequence; and means for processing said combined transform samples using said recovery data carrier sequence to recover said auxiliary data subband samples from said recovered combined transform samples.

37. The decoder of claim 36, wherein said recovery data carrier sequence comprises at least one of:

(a) a pseudo-noise (PN) sequence provided over at least one spatial frequency of said video transform samples;

(b) different PN transform sequences provided over one spatial frequency of said video transform samples;

(c) time-shifted versions of the same PN transform sequence provided over one spatial frequency of said video transform samples;

(d) a sparse PN sequence provided over at least one spatial frequency of said video transform samples;

(e) different sparse PN sequences provided over one spatial frequency of said video transform samples;

(f) time-shifted versions of the same sparse PN sequence provided over one spatial frequency of said video transform samples;

(g) a sample twiddling sequence provided over at least one spatial frequency of said video transform samples;

(h) different sample twiddling sequences provided over one spatial frequency of said video transform samples;

(i) time-shifted versions of the same sample twiddling sequence provided over one spatial frequency of said video transform samples;

(j) a bit twiddling sequence provided over at least one spatial frequency of said video transform samples;

(k) different bit twiddling sequences provided over one spatial frequency of said video transform samples; and (l) time-shifted versions of the same bit twiddling sequence provided over one spatial frequency of said video transform samples.

38. The decoder of claim 36, wherein said means for processing comprises:

means for demodulating said recovered combined transform samples using said recovery data carrier sequence to recover said auxiliary data subband samples; and means for integrating said recovered auxiliary data subband samples to provide despread auxiliary data subband samples.

39. The decoder of claim 38, further comprising:

means for summing said despread auxiliary data subband samples across selected spatial frequencies thereof to recover said auxiliary data signal.

40. The decoder of claim 36, wherein said video transform samples have a nonuniform power spectrum, further comprising:

a normalizer for normalizing said video transform samples in said combined subband samples to provide an approximately uniform power spectrum for said video transform samples.

41. The decoder of claim 36, further comprising:

a normalizer for normalizing said combined transform samples to provide an approximately uniform power spectrum for said auxiliary data subband samples.

42. The decoder of claim 36, further comprising:

an inverse quantizer for inverse quantizing said combined transform samples; and means for allocating bits for said inverse quantizing.

43. The decoder of claim 36, wherein auxiliary data subband samples corresponding to different auxiliary data signals are carried in said combined transform samples of said digital video data stream; and said means for processing processes said combined transform samples using different recovery data carrier sequences.

44. The decoder of claim 36, wherein said recovery data carrier sequence is filtered over a plurality of spatial frequencies of said video transform samples.

45. The decoder of claim 36, wherein said auxiliary data subband samples are carried in a plurality of spatial frequencies of said combined transform samples.

46. The decoder of claim 36, wherein said video transform samples comprise spatially transformed pixel data from at least one of an intra coded image and a differentially coded image.

47. A compressed digital data storage media, comprising:

(i) storage means for storing combined transform samples including video transform samples which represent a video signal, and auxiliary data subband samples which represent an auxiliary data signal;

said auxiliary data subband samples being provided by modulating a data carrier sequence by said auxiliary data signal over at least one spatial frequency corresponding to said video transform samples;

said auxiliary data subband samples being carried substantially imperceptibly in said video signal;

said auxiliary data signal being spectrally shaped according to said video signal; and (ii) means for allowing the recovery of said auxiliary data signal from said auxiliary data subband samples.

48. The storage media of claim 47, wherein auxiliary data subband samples corresponding to different auxiliary data signals are carried in said combined transform samples.

49. The storage media of claim 47, wherein auxiliary data subband samples corresponding to different auxiliary data signals are carried in an associated spatial frequency of said video transform samples.

50. The storage media of claim 47, wherein said data carrier sequence comprises at least one of:

(a) a pseudo-noise (PN) sequence provided over at least one spatial frequency of said video transform samples;

(b) different PN transform sequences provided over one spatial frequency of said video transform samples;

(c) time-shifted versions of the same PN transform sequence provided over one spatial frequency of said video transform samples;

(d) a sparse PN sequence provided over at least one spatial frequency of said video transform samples;

(e) different sparse PN sequences provided over one spatial frequency of said video transform samples;

(f) time-shifted versions of the same sparse PN sequence provided over one spatial frequency of said video transform samples;

(g) a sample twiddling sequence provided over at least one spatial frequency of said video transform samples;

(h) different sample twiddling sequences provided over one spatial frequency of said video transform samples;

(i) time-shifted versions of the same sample twiddling sequence provided over one spatial frequency of said video transform samples;

(j) a bit twiddling sequence provided over at least one spatial frequency of said video transform samples;

(k) different bit twiddling sequences provided over one spatial frequency of said video transform samples; and (l) time-shifted versions of the same bit twiddling sequence provided over one spatial frequency of said video transform samples.

51. The storage media of claim 47, wherein said data carrier sequence is filtered over a plurality of spatial frequencies of said video transform samples.

52. The storage media of claim 47, wherein said auxiliary data subband samples are carried in a plurality of spatial frequencies of said combined transform samples.

53. The storage media of claim 47, wherein said video transform samples comprise spatially transformed pixel data from at least one of an intra coded image and a differentially coded image.

* * * * *